United States Patent [19]
Hurst

[11] 3,728,664
[45] Apr. 17, 1973

[54] BATTERY LATCHING MECHANISM
[75] Inventor: David T. Hurst, Winter Park, Fla.
[73] Assignee: Repco Incorporated, Orlando, Fla.
[22] Filed: Dec. 21, 1971
[21] Appl. No.: 210,397

[52] U.S. Cl..................................339/91 R, 325/16
[51] Int. Cl. ..............................................H01r 13/54
[58] Field of Search............................339/75, 91, 4; 325/16

[56] References Cited
UNITED STATES PATENTS 2,560,320   7/1951   Minkler..................................325/16
2,899,669   8/1959   Johanson............................339/91 R Primary Examiner—Joseph H. McGlynn
Attorney—John E. Benoit

[57] ABSTRACT

A transceiver radio unit having a detachable battery contained in its own housing. A battery latching mechanism comprising a rigid finger extending downwardly from the lower end of the transceiver housing which mates with a notch in the battery housing. On the opposite side of the transceiver housing is a spring biased button member. Curved posts with camming surfaces are mounted on the battery housing to mate with the button member. Terminals and mating contacts are located on the battery and transceiver housings respectively.

6 Claims, 6 Drawing Figures

PATENTED APR 17 1973
3,728,664
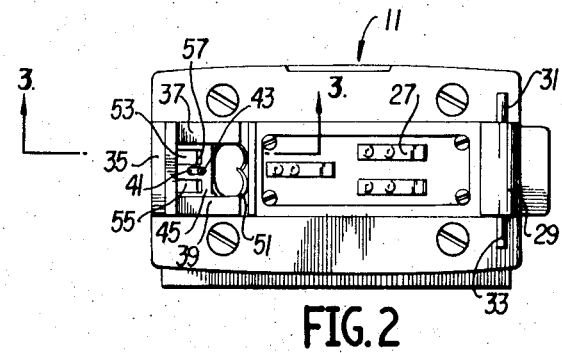
FIG. 2
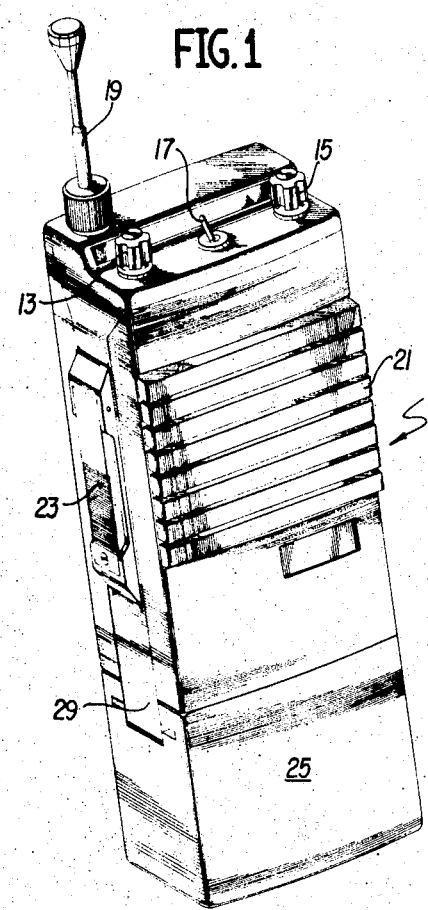
FIG. 1
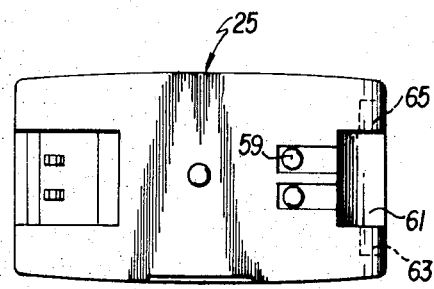
FIG. 4
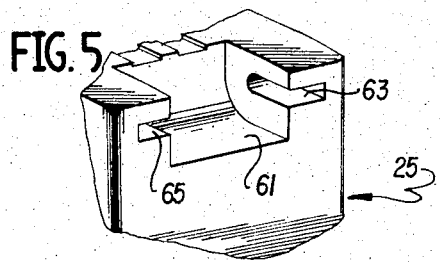
FIG. 5
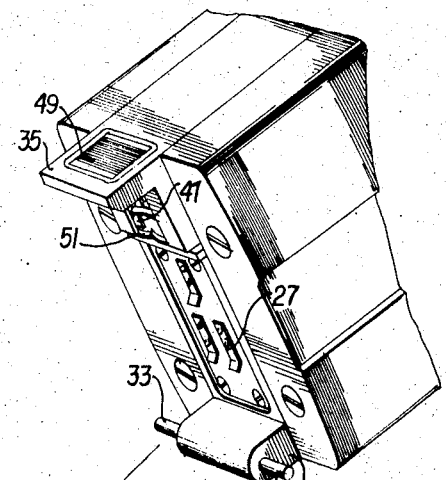
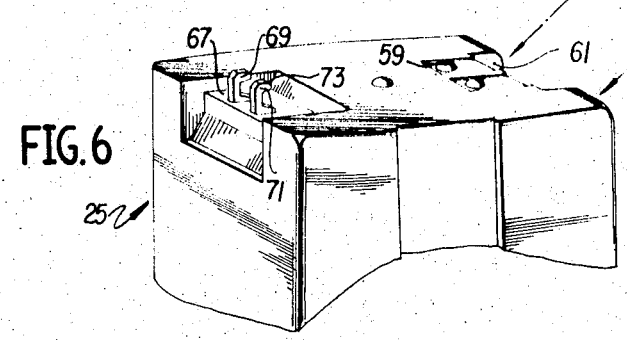
FIG. 6
FIG. 3

BATTERY LATCHING MECHANISM

This application relates generally to portable transceivers and more specifically to latching mechanisms for providing a quick release of the battery housing for such portable transceivers.

Transceiver devices are well-known and in wide spread use today both in commercial and private use. The transceivers generally in private use have non-rechargeable batteries therein and are not provided with a battery designed for quick replacement so that the device may be used constantly over a 24 hour period.

On the other hand, commercial transceiver devices are built with a much more rugged construction and more precise channel selection because of the extremely rough and continuous use to which they are subjected. Additionally, the only practical means for providing energy to these commercial devices is to use rechargeable battery elements. The reason for this is that the individual transceivers are relatively expensive and it is desirable to obtain the maximum usage with each unit. Therefore, if the company using a large number of transceivers also has a compatible battery recharger, fresh batteries are available at all times when needed. Normally, the transceiver and associated rechargeable battery will operate for approximately an 8 hour period which matches the normal work shift for the personnel using the device. At a change of shift, the oncoming worker merely removes the rechargeable battery, places it in the battery chaRger and removes a fully charged battery from the battery charger for use with the transceiver.

The above is standard procedure in large operations today. Most of the transceivers in use today have a battery contained in a housing which mates with the housing of the transceiver and is secured thereto by means such as a screw or the like. Securing devices such as screws require either a tool such as a screwdriver or at the very least a coin. Often times the battery is so tightly secured that a coin will not operate satisfactorily. Additionally, a certain amount of time is wasted by not being able to quickly remove and replace the battery. Further, the lack of convenience may often result in the oncoming shift avoiding a battery change with the resultant failure of the radio at an inopportune time.

Accordingly, it is an object of the present invention to provide a transceiver with an easily removable battery housing.

A further object of the invention is to provide a removable battery housing for a transceiver which is unlatched by merely pressing a spring loaded button and rotating the battery casing whereby it drops away from the transceiver unit.

These and other objects of the invention will become apparent from the following description when taken in conjunction with the drawings wherein FIG. 1 is a perspective view of one type of transceiver used with the present invention;

FIG. 2 is a bottom view of the transceiver housing with the battery removed;

FIG. 3 is a sectional view taken through the lines 3—3 of FIG. 2;

FIG. 4 is a plan view of the top of the battery housing;

FIG. 5 is a partial sectional view of one upper end of the battery housing; and

FIG. 6 is an exploded view illustrating the relative position for attachment and removal of the battery housing from the transceiver housing.

Broadly speaking, the present invention relates to a transceiver radio unit which includes a battery housed in a separate unit which is removably attached to the transceiver by a device which comprises a rigid finger means extending downwardly from one side of the transceiver housing and a spring biased button mean opposite the finger means also at the lower side of the transceiver housing. The battery housing has a groove means within one side thereof which mates with and receives the rigid finger means. The opposite side of the battery housing has a camming means extending upwardly and outwardly for moving and mating with the button means whereby the device is secured to the housing and may be released therefrom by depressing the button means to overcome the spring bias means and release the camming and mating device. The mating end of the battery housing has terminals which match with contact means at the mating end of the transceiver housing.

Turning now more specifically to the drawings, there is shown in FIG. 1 a transceiver housing 11 having an on-off switch knob 13 and a squelch knob 15. The standard transceiver also includes a channel selector switch 17, an antenna 19, a speaker 21 and a push-to-talk switch 23.

A rechargeable battery housing 25 is secured to the transceiver housing by means which will be described in connection with FIGS. 2–6.

FIG. 2 illustrates the lower end or bottom of the transceiver housing 11 which includes electrical contacts 27 for mating with the terminals 59 on the battery housing.

Extending downwardly from one side of the transceiver housing 11 is a rigid finger member 29 having rods 31 and 33 extending outwardly from either side thereof.

At the opposite side of the lower end of the transceiver housing 11 there is a flange 35 extending downwardly from the receiver housing. This flange forms an integral L-shaped member having one leg extending along the inner face of the lower part of the transceiver housing. This leg includes two outer sections 37 and 39 which form channels such as shown at 47 in FIG. 6.

A rigid L-shaped button 45 has a slot 41 which passes over post 43 extending upwardly from the leg 35.

Button 45 may be provided with a serrated face 49 so as to prevent slippage when the button is being depressed to release the batter housing from the transceiver housing.

A spring member 51 is located across and within the channels 41 so as to bias the button member 45 outwardly.

The L-shaped button member also has channel 53 and 55 extending along one face thereof with the channels terminating in an inclined surface 57 as shown more clearly in FIG. 3.

Turning now to FIGS. 4 and 5, it will be seen that the battery housing is provided with a notch 61 which is of a dimension to accept the rigid finger 29 of the transceiver housing.

Extending outwardly from the notch and within the faces of the notch 61 are grooves 63 and 65 which are of a dimension to accept the posts 31 and 33 extending outwardly from the rigid finger 29.

Opposite notch 61 on the other side of the battery housing 25 is located a cut-away section 67 which accepts the rigid flange 35. Extending upwardly from the cut-away section 67 are dual posts 69 and 71 which terminate in curved ends having camming edges 73.

It will be seen that when it is desired to connect the battery housing to the transceiver housing it is tilted at an angle thereto, as shown in FIG. 6, whereby the rigid finger 29 passes into the notch 61 and the posts 31 and 33 are nested within the grooves 63 and 65.

The battery housing 25 is then rotated so as to come into contact with the transceiver housing 11 whereby the camming edges 73 of the posts 69 and 71 bear against the inclined surface 57 of the channels 53 and 55 so as to bias the button member 45 against the spring bias and allow the upper part of the posts to pass beyond the inclined face 57. As these posts pass beyond the inclined face, the spring bias again moves the button outwardly and the battery is firmly locked in place by the action between the button member and the posts 69 and 71.

When the battery is to be removed from the transceiver housing, it is merely necessary to depress the button 45 by means of the serrated face 49 so as to overcome the bias spring and release the post members 69 and 71 from retention by the button member. The battery housing is then rotated approximately 45° whereby the rods 31 and 33 may be slipped outwardly from the rooves 63 and 65.

It will be seen that there has been provided by this invention a quick and easily operable release mechanism for a battery which is used with a transceiver device. Accordingly, batteries may be changed quickly and with no extra equipment whatsoever.

It is to be understood that the above description and drawings are illustrative only and that the scope of this invention is limited only by the following claims.

I claim:

1. In a portable transceiver including a rechargeable battery, a connector for securing said battery to said transceiver comprising
  a housing for said transceiver,
  a rigid finger extending from the lower end of said transceiver housing at one side thereof,
  a rod extending outwardly from either side of said finger,
  a spring biased L-shaped button member secured to the lower end of said transceiver housing at the other side thereof, one leg of said button member extending inwardly along the lower end of said transceiver housing,
  channels in said one leg of said button member,
  a housing for said rechargeable battery, said housing for said battery having a dimension at its upper end substantially the same as the dimension of the lower end of said transceiver housing,
  a notch in the upper end of said battery housing at one side thereof for receiving said rigid finger,
  grooves in said battery housing adjacent said notch for receiving said rods,
  posts having curved upper ends for mating with said channels in said button member, said posts moving said button member to overcome said spring bias and passing into a locking position with said one leg of said button member,
  electrical terminals on the upper end of said battery housing, and
  contact members on said transceiver housing for mating with said terminals when said housing are connected.

2. In a portable transceiver including a housing for a transceiver and a housing for a battery, a device for connecting said housings together comprising
  rigid finger means extending below said transceiver hosing on one side thereof,
  a female spring biased button means substantially opposite said ringer means on said transistor housing,
  grooved means within one side of said battery housing for receiving said rigid finger means,
  camming means extending outwardly from the other side of said battery housing for moving and mating with said button means,
  terminal means at one end of said battery housing; and contact means at one end of said transceiver housing for mating with said terminal means.

3. The device of claim 2 wherein said rigid finer means comprises
  a finger, and
  a post extending from either side of said finger.

4. The device of claim 3 wherein said grooved means comprises
  a groove having a dimension sufficient to accept said finger, and
  slots extending outwardly from said groove for accepting said posts.

5. The device of claim 2 wherein said button means comprises
  a rigid L-shaped member having one leg of said member lying in the face of one end of said transceiver housing,
  channels in said one leg for accepting said camming means.

6. The device of claim 5 wherein said camming means comprises
  posts having curved upper ends with camming surfaces for mating with said channels, said posts moving said L-shaped member to overcome said spring bias and passing into a locking position with said one leg of said L-shaped member.

* * * * *